Patented Oct. 23, 1945

2,387,267

UNITED STATES PATENT OFFICE 2,387,267

OPERATION OF CATALYTIC PLANTS

Eugene J. Houdry, Ardmore, Pa., assignor to Houdry Process Corporation, Wilmington, Del., a corporation of Delaware No Drawing. Application May 10, 1941,
Serial No. 392,953

9 Claims. (Cl. 196—52)

This invention relates to the operation of catalytic plants utilizing a plurality of converters in which the catalyst is periodically subjected to regeneration in situ in order that the desired reaction may proceed in a continuous manner.

The normal operation is to conduct the desired reaction in one or more converters, while a similar, and usually a greater, number undergo regeneration. In a typical plant two converters may be in regeneration for every one on stream. Hence large plants frequently are constructed in which the converters are in multiples of three, as six, nine, twelve, etc. Heretofore it has been the practice, when repairs or changes were needed, including replacement of catalyst, to shut such plants down entirely or to operate them on a greatly restricted scale, as at a fraction of the normal rate (two-thirds, one-half, or the like), thereby often upsetting commercial operation and production and the quantitative balance of marketable products.

One object of the invention is to effect repairs, modifications and changes of catalyst in plants of the multiple converter type while the plants are maintained in substantially full operation. Another object is to eliminate, or at least greatly to minimize, interference with normal commercial operation and production during infrequent renewal of catalysts or equipment in multiple converter installations. Other objects will be apparent from the detailed description which follows.

The invention comprises reducing the number of converters on stream by cutting out at least one converter for the needed repairs, changes, or replacement of catalyst without reducing the number of converters in regeneration. This requires a regrouping of the converters giving a smaller number in each group but more groups, and since there are then fewer converters on stream at a time, the on-stream periods are shortened thus making the time cycle for the plant somewhat shorter. The plant charging rates remain the same as for normal operation and the quantities of reactants per unit volume of catalyst remain constant. The regrouping of the converters, however, provides not less than the same number of converters in regeneration as in normal operation and for not less than the same regeneration periods. Due to the smaller quantity of catalyst available for on-stream operations the time of contact of the reactants with the catalyst will be reduced thus reducing the intensity of the reaction. The production of desired products will accordingly be less than in normal operation when the other operationg conditions (temperature and pressure) are unchanged. Adjustments in temperature or pressure are ordinarily not difficult and by minor variations in the same the yield of desired products can be made to approach and even to approximate normal plant operation. Maintenance of full regeneration periods insures proper restoration of catalyst activity and consequent uniformity of plant operation during repairs and catalyst replacement, as well as subsequently when the plant is again put back on normal operation. The changes back and forth between normal and repair operation are neither difficult nor complicated since the plant charging rate is unchanged and the resulting variations in products are not so great as to upset or materially change the functioning of such auxiliary equipment as heat exchangers, bubble towers, condensers, etc.

When the operation conditions are not changed the net effect in a catalytic cracking plant to make gasoline, for example, is usually a reduction in the quantity of gasoline produced but an increase in the overall liquid yield. By modifying somewhat the operating conditions, as by increasing the reaction temperature, or pressure, or both, if the plant equipment will permit, it is often possible to bring the yield of gasoline back to approximately that of the plant yield when operating normally. In some instances, with certain stocks it is even possible to secure an increased gasoline yield over normal operations. It is well known that increased reaction temperature within certain limits will improve the octane of the gasoline and that conversely, increased pressure tends to lower the octane number of the product. Hence, when operating conditions are changed for the purpose of improving the gasoline yield, it is preferable to increase the temperature rather than the pressure.

In a typical illustration a catalytic oil cracking plant employing nine converters or cases for the production of motor fuels was normally operated with three converters in parallel on stream for fifteen minutes. At the end of the period another group of three converters was switched to on stream operation. Thus one group was always on stream while two other groups were in regeneration; thus the time allowed for the necessary purging and regeneration steps was thirty minutes giving an overall time cycle for the plant of forty-five minutes. To make inspections, repairs or to replace catalyst one converter at a time was cut out of operation and the eight remaining converters were utilized in groups of two, thus making four groups, one group of which would be on-stream while the other three groups were undergoing regeneration. Since the charging rate to the plant was not to be changed and there were only two converters instead of three to receive the charge, the on-stream period was reduced to ten minutes so that there would be no change in the quantity of reactants per volume of catalyst nor in the number of converters in regeneration nor in the period of regeneration (thirty minutes) per converter. The net effect was to reduce the overall time cycle for the plant from forty-five to forty minutes and to increase by 50% the feed rate over the catalyst during on-stream periods.

If it is necessary or desirable to cut two converters out of a nine case plant, still another arrangement is possible. Each of the seven remaining converters is operated by itself thus providing seven groups, each made up of one converter. One group or converter is on-stream while the other six are in regeneration. The on-stream period is now five minutes and the time cycle for the plant is thirty-five minutes. The full plant charge goes to one converter but for only five minutes: hence the quantity of charge per volume of catalyst is the same as in normal plant operation but the feed rate over the catalyst has been increased by 200%. There are still six converters in regeneration, however, and for the full thirty minutes as in normal plant operation. Hence it is possible to compensate partially for the lowering of gasoline production due to the reduced contact time by increasing somewhat the temperature and/or pressure conditions of the on-stream reaction.

With plants having twelve catalytic cases divided for normal operation into three groups of four converters each, one group at a time being utilized for gasoline production, while the other two groups are in stages of regeneration, it is possible to segregate two cases at a time for changing catalyst or for repairs. The remaining ten cases are then divided into five groups of two cases each, one group being on stream for gasoline production, while the other four groups are in stages of regeneration. Inasmuch as the on-stream reaction is now effected in two cases instead of four, the feed rate will be increased 100% over normal operation, so that the reactants will pass over the catalyst at twice the usual rate, but for half the time. If the on-stream period had previously been ten minutes it now becomes five, so that each case in each of the five groups will be on stream for five minutes at double rate and in regeneration for twenty minutes, the overall time cycle for the plant becoming twenty-five minutes instead of thirty minutes. The regeneration time for each converter thus remains twenty minutes, the same as when the converters were divided into three groups and the operating period was ten minutes. Typical results of normal and short period operations in twelve case plants are given in the following examples.

*Example 1*

A highly active synthetic catalyst comprising essentially silica and alumina in the mol ratio of silica to alumina of 11.8:1 was utilized for the conversion of East Texas gas oil with a 36° A. P. I. gravity, the operating conditions and yields for both ten minute and five minute on-stream operating periods being given below. No steam or other vaporizing medium was used.

| | | | |
|---|---|---|---|
| On stream: | | | |
| Operating period in minutes | 10 | 5 | 5 |
| Operating temperature, °F | 800 | 800 | 825 |
| Operating pressure, #/sq. in | 7 | 7 | 7 |
| Feed rate (volume of oil liquid to volume of catalyst) | 1:1 | 2:1 | 2:1 |
| Yields: | | | |
| Gas make (% by weight of charge) | 9.1 | 6.0 | 7.7 |
| Coke make (% by weight of charge) | 5.8 | 4.7 | 5.2 |
| Coke (grams/liter of catalyst) | 8.3 | 6.7 | 7.4 |
| Liquid recovery (% volume of charge) | 92.0 | 96.4 | 93.9 |
| 410° end point gasoline (% by volume of charge) | 51.5 | 48.5 | 50.0 |
| C. F. R. M. (A. S. T. M.) octane of gasoline | 78.5 | 78.5 | 78.8 |

From this table it is apparent that when the plant was shifted to a five minute on-stream period (second vertical column) the gasoline yield was reduced 3%, from 51.5 to 48.5, but the liquid recovery increased from 92% to 96.4%. The gas and coke makes in accordance with the reduced gasoline yield were lower. When the temperature was raised 25° (third vertical column) the yield of gasoline rose slightly to 50%, the overall liquid recovery being then 93.9, while the gas and coke makes were slightly under the results with the normal ten minute period.

The above figures are typical of a plant operating with a catalyst of high activity but requiring cases to be cut out of operation for inspection or repairs.

*Example 2*

Another twelve case gasoline plant had as charging stock a heavy bottoms cut of an East Texas crude conforming substantially to 45% of the crude from which some small amount of the difficultly vaporizable material representing not more than 8 to 10% of the crude was removed in a tar separator in advance of the cracking cases. The remainder in vapor phase was charged to the catalytic cases under 10#/sq. in. pressure and with 10% by weight of steam as a vaporizing medium. The catalyst was essentially silica and alumina derived from natural clays activated by acid or other chemical treatment and formed in molded pieces of small size having a weight ratio of silica to alumina of about 4:1 and conforming generally to the disclosure of my United States Patent #2,078,945, issued May 4, 1937. By reason of extended use the catalyst had fallen off in activity until the substitution of a new catalyst was desirable. Two converter cases were cut out at a time for catalyst change with rearrangement of converter groups and reduction in on-stream period from ten to five minutes as previously described. The following table gives comparative figures on operating conditions and yields.

| | | | |
|---|---|---|---|
| On stream: | | | |
| Operating period in minutes | 10 | 5 | 5 |
| Operating temperature, °F | 825 | 825 | 850 |
| Feed rate (volume of oil liquid to volume of catalyst) | 1:1 | 2:1 | 2:1 |
| Yields: | | | |
| Gas make (% by weight of charge) | 7.0 | 5.5 | 7.5 |
| Coke make (% by weight of charge) | 4.2 | 3.4 | 4.2 |
| Coke (grams/liter of catalyst) | 5.5 | 4.5 | 5.5 |
| Liquid recovery (% volume of charge) | 97.0 | 99.5 | 96.5 |
| 410° end point gasoline (% by volume of gasoline) | 34.0 | 31.5 | 34.0 |
| C. F. R. M. (A. S. T. M.) octane of gasoline | 79.0 | 79.0 | 80.0 |

From the above table it is apparent that on shifting to the five minute on-stream period with the operating conditions the same as during normal running, there was a gain in liquid recovery but a corresponding drop in gasoline production. By raising the temperature 25° the gasoline production of normal running was obtained but with some slight loss in liquid recovery.

The above data regarding twelve case plants is directly applicable to six case plants, the only difference being a smaller number of converters in each group, namely one instead of two when reducing the length of on-stream periods.

In order to make the regrouping of the converters for the cutting out of one or more converters for repairs or changes of catalyst some minor changes in piping, valve operation and control will be necessary, especially when the steps of the process cycle are automatically controlled in proper timed sequences through the use of cycle timers as disclosed for example in the copending application of Thomas, Pearson and Nopper, Serial No. 160,122, filed August 20, 1937, now Patent No. 2,250,507, issued July 29, 1941. When regeneration is effected under pressure and there is power recovery from the regeneration fumes, as disclosed for example in United States Patent #2,167,698, issued to R. S. Vose or in Patent #2,167,655, issued to myself and R. S. Vose, on August 1, 1939, modifications in piping and methods of control may be required to eliminate the possibility of explosion when changing the grouping of converters and shortening the on-stream periods. The necessary connections, cross-overs, and controls can be made a part of the original plant construction or installed later as desired.

The invention is not limited to the treatment or conversion of hydrocarbons or to the use of silica-alumina catalysts but is applicable to any and all kinds of chemical reactions promoted or in any wise assisted by contact masses wherein the contact masses accumulate during the reactions a contaminating deposit which must be from time to time removed, by combustion or in any other known or suitable manner, if the reactions are to continue.

I claim as my invention:

1. In the operation of plants for conducting chemical reactions promoted by catalysts operated alternately on-stream and in regeneration with the catalysts disposed in a plurality of converters divided into groups for sequential on-stream periods to permit continuous production of desired reaction products, the method of isolating converters for repairs, changing of catalyst, etc. with minimum interference with plant production and operation which comprises cutting one converter at a time out of the plant cycle, rearranging the grouping of the converters to provide more groups with fewer converters in each group and reducing the on-stream period for each group without reducing the period of regeneration for each converter.

2. In the operation of plants for conducting chemical reactions promoted by catalysts operated alternately on-stream and in regeneration with the catalysts disposed in a plurality of converters divided into groups for sequential on-stream periods to permit continuous production of desired reaction products, one group being on stream while the other groups are in regeneration, the method of isolating converters for inspections, repairs, catalyst changes, etc, without shutting down the plant or seriously impairing plant operation or production which comprises isolating at least one converter at a time and then rearranging the grouping to make more groups but to decrease the number of converters in each group thereby to provide fewer converters on stream at any time but no reduction in the number of converters in regeneration, and reducing the length of the on-stream periods in proportion to the reduction in the number of converters in each group.

3. In the operation of plants for conducting chemical reactions promoted by catalysts operated alternately on-stream and in regeneration with the catalysts disposed in a plurality of converters divided into groups for sequential on-stream periods to permit continuous production of desired reaction products, one group being on stream while the other groups are in regeneration, the method of isolating converters for inspections, repairs, catalyst changes, etc. without shutting down the plant or seriously impairing plant operation or production which comprises cutting out of the plant cycle at least one converter at a time and then rearranging the grouping to provide more groups with fewer converters in each, reducing the on-stream periods in proportion to the reduction in volume of catalyst, and intensifying the on-stream reaction conditions to offset at least in part the reduction in yield from the smaller quantity of catalyst.

4. Method for continuous operation of a catalytic plant having a plurality of converters containing catalyst utilized in alternation for the on-stream or productive reaction and for a regenerative reaction to restore the catalyst to active condition which comprises dividing the converters into groups for simultaneously effecting both on-stream and regenerative reactions in a stepped time cycle for normal operation, when repairs or changes of catalysts are required, isolating at least one of the converters at a time from the plant cycle and regrouping the converters to make more groups with fewer converters in each group, adjusting the time cycle without disturbing the charging rate of reactants to the plant so that there is no change in the quantity of reactants per volume of catalyst, and reverting to the original converter grouping and time cycle for normal operation when repairs or catalyst changes are completed.

5. Method for continuous operation of catalyst plant having a plurality of converters containing catalyst utilized in alternation for the on-stream or productive reaction and for a regenerative reaction to restore the catalyst to active condition which comprises dividing the converters into groups for simultaneously effecting both on-stream and regenerative reactions in a stepped time cycle for normal operation, when repairs or changes of catalyst are required, isolating at least one of the converters at a time from the plant cycle and regrouping the converters to make more groups with fewer converters in each group, adjusting the time cycle without disturbing the charging rate of reactants to the plant so that there is no change in the quantity of reactants per volume of catalyst, intensifying the conditions of on-stream operation to compensate at least in part for the reduced quantity of catalyst while maintaining the period and conditions of regeneration the same as for normal operation, and reverting to the original converter grouping, time cycle and operating conditions of normal operation when the repairs or catalyst changes are completed.

6. The method of making repairs or changes of catalyst in a multi-converter catalytic plant without interfering with the continuous operation of the same which comprises maintaining the same charging rate to the plant while isolating from the plant cycle at least one converter, reducing correspondingly the number of converters on stream at any time but not the number of converters in regeneration, and reducing the on-stream period to correspond to the reduction in catalyst volume without reducing the period of regeneration for any converter.

7. The method of making repairs or changes of catalyst in a multi-converter catalytic plant having at least six, or a higher multiple of three, converters without interfering with the continuous operation of the plant which comprises isolating from the plant cycle at least one converter at a time without reducing the charging rate to the plant, reducing the number of converters on stream at any one time by the number of converters isolated from the cycle, and reducing by at least one-third the on-stream period without reducing the period of regeneration for any converter until the repairs or changes of catalyst are completed.

8. The method of making repairs or changes of catalyst in a multi-converter catalytic plant adapted for continuous operation and having at least six converters, or a multiple of six, divided into three groups of equal size of which one group is always on stream while the others are in regeneration which comprises continuing the operation of the plant with the same charging rate but isolating from the plant cycle one-half of the converters of one group and splitting each of the other original groups into two groups, operating thereafter with one reduced group on-stream and four reduced groups in regeneration, and halving the on-stream period so as to make no change in the quantity of charge per volume of catalyst or in the period of regeneration for each converter.

9. In a nine case catalytic plant for the conversion or treatment of hydrocarbons and adapted for continuous operation with three cases always on stream while the remainder are in regeneration the method of making repairs or changes of catalyst without interfering with the operation of the plant which comprises maintaining the same charging rate as for normal operation but isolating two cases from the plant cycle and thereafter running with one case always on stream while six are always in regeneration, and reducing the on-stream period by two thirds in order not to change the quantity of reactants per volume of catalyst nor to reduce the period of regeneration for each converter.

EUGENE J. HOUDRY.